United States Patent
Chakravarthy et al.

(10) Patent No.: US 11,782,963 B2
(45) Date of Patent: Oct. 10, 2023

(54) SEMANTIC DATABASE QUERY METHOD

(71) Applicant: THE SECRETARY OF STATE FOR DEFENCE, Salisbury (GB)

(72) Inventors: Ajay Chakravarthy, Salisbury (GB); Robin James Williamson, Porton Down (GB)

(73) Assignee: The Secretary of State for Defence, Salisbury (GB)

( * ) Notice: Subject to any disclaimer, the term of this patent is extended or adjusted under 35 U.S.C. 154(b) by 141 days.

(21) Appl. No.: 17/248,375

(22) Filed: Jan. 22, 2021

(65) Prior Publication Data
US 2021/0232617 A1  Jul. 29, 2021

(30) Foreign Application Priority Data

Jan. 23, 2020 (GB) .................................... 2000969
Dec. 27, 2020 (GB) .................................... 2020642

(51) Int. Cl.
| | |
|---|---|
| G06F 16/36 | (2019.01) |
| G06F 16/332 | (2019.01) |
| G06F 16/35 | (2019.01) |
| G06K 9/00 | (2022.01) |
| G06F 16/33 | (2019.01) |
| G06V 30/418 | (2022.01) |

(52) U.S. Cl.
CPC ........ *G06F 16/3344* (2019.01); *G06F 16/332* (2019.01); *G06F 16/355* (2019.01); *G06F 16/367* (2019.01); *G06V 30/418* (2022.01)

(58) Field of Classification Search
CPC .... G06F 16/367; G06F 16/332; G06F 16/355; G06F 16/3344; G06V 30/418; G06K 9/6201
See application file for complete search history.

(56) References Cited

U.S. PATENT DOCUMENTS

| | | | |
|---|---|---|---|
| 8,775,442 B2 | 7/2014 | Moore et al. | |
| 2009/0037457 A1* | 2/2009 | Musgrove | ............. G06F 16/358 707/999.102 |
| 2012/0233127 A1* | 9/2012 | Solmer | ............... G06F 16/3347 707/769 |

(Continued)

OTHER PUBLICATIONS

United Kingdom Patent Application No. GB2000969.2, Combined Search and Examination Report dated Jun. 11, 2020, 6 pages.

*Primary Examiner* — Hosain T Alam
*Assistant Examiner* — Chongsuh Park
(74) *Attorney, Agent, or Firm* — Kilpatrick Townsend & Stockton LLP (57) ABSTRACT

A computer implemented method of determining a fact matching a user requirement. The method involves providing an ontology and a semantic database, controlling a computer processor to perform the steps of accepting a query defining a template for a statement regarding a fact, identifying matching patterns in the semantic database, and outputting either a matching statement or information supporting the user to locate corresponding information. A formula is provided that defines a maximum semantic distance that a class or instance may be broadened to. In identifying the patterns, for each instance/class having a non-zero divergence value, one or more broader classes is accordingly treated as a match.

18 Claims, 6 Drawing Sheets

(56) References Cited

U.S. PATENT DOCUMENTS

2015/0235160 A1* 8/2015 Larlus-Larrondo ........................ G06Q 10/06398
705/7.42
2016/0224569 A1* 8/2016 Cuddihy ............. G06F 16/3322
2020/0388390 A1* 12/2020 Singh ...................... H04L 63/20

* cited by examiner

SEMANTIC DATABASE QUERY METHOD

CROSS REFERENCE TO RELATED APPLICATIONS

This application claims the benefit of priority to United Kingdom Patent Application No. 2000969.2 filed on Jan. 23, 2020, and United Kingdom Patent Application No. 2020642.1 filed on Dec. 27, 2020, the contents of both of which are incorporated herein by reference.

The invention relates to a method of interrogating a sematic database, and more specifically to Semantic Search Algorithms (SSAs), where the user starts with partial or incomplete knowledge and derives the full picture which the use of the algorithm. In the field of information retrieval, known SSAs can receive as an input a search pattern (also known as search query), comprising of a series of nodes and associated values, which the algorithm then uses to look up within a database patterns which correspond to the search query. For example, a travel website may take input values for a series of nodes corresponding to location, cost, and date range (with associated values such as "Spain", "under £3000", "from 1/8/2018") and return suitable patterns from the database which match the search query.

The article https://docs.oracle.com/cd/B19306_01/text.102/b14218/cqoper.htm#i997220 discusses how you can do Boolean text searches on unstructured (non-semantically labelled) text documents, enabling a user to run a query for the word "crane" for example. The user can ask it to search for broader terms—by typing "BT(crane)" it will return terms like 'bird' and 'machine' albeit without any consideration of whether these types of broadening are too broad or not broad enough.

This article https://www.sciencedirect.com/science/article/pii/S1570826810000582 discusses several semantic text search interfaces, and their pros and cons. As an example Semantic Crystal interface is described at section 2.4, where a query is constructed based on a representation of the data ontology relevant to a particular object (in this case—movie). If a user clicks on a class (e.g. an object such as movie) the user is presented with options as to what properties of the object might be of interest. The user constructs a query by adding links. On the left in the ontology, the blue arrows indicate that some classes are subclasses of other classes (i.e. narrower in scope, e.g. person is a sub-class of director). Therefore the user is able to decide which search term to use.

Other known semantic search engines include algorithms which can search on synonymous search terms to that or those provided by the user. This is particularly useful where many synonyms exist for a concept, and provide the operator with relevant responses which would otherwise be missed. For example, a "camera" may alternatively be called "photographic equipment" "photographic device" "image capture means" etc.

An ontology is a way of representing a known domain in a semantic manner, that is, giving it meaning by setting out one or more hierarchies and the relationships between the "classes" within. An ontology is more complex than a simple hierarchy, due to the interrelationships between classes which are captured. By comparison a hierarchy only contains relationship information relating to the hierarchy itself, e.g. parent, child, sibling relationships. The relationship information in a hierarchy is implicitly captured by the relative position of two classes in the hierarchy. In an ontology, relationships can be captured between any classes within the ontology, and the relationship can be of any suitable form. An ontology may comprise one or more hierarchies, often many.

SSAs interrogate semantic databases (databases that have labelled data and associated ontology). The ontology can be created in real time, i.e. as the query is run but more commonly already exists for the semantic database to be searched.

U.S. Pat. No. 8,775,442 discloses a method of searching involving building a taxonomy and considering related terms nearby within the taxonomy.

In accordance with a first aspect of the invention, the method of claim 1 is provided.

Accordingly the user can build a query from linked instances/classes that has sufficient structure as to provide a context that restricts possible search results, and the user can choose to nominate certain instances/classes (i.e. typically words, also described as nodes) which the user has less certainty over, thus directing the computer to broaden those terms but to do so in proportion to how much broadening would be possible, with the result that the returned search results contain statements matching what the user is interested in, but yet can inform the user of categories of things that the user did not know existed but which nonetheless match what the user is interested due to the context being constrained by the graph structure of the user's query. Accordingly this has the advantage that the user can find out not only about unknowns, but also potentially about unknown unknowns of interest to the user (things of a type which the user was unaware of), whereas by contrast with existing approaches the user can mostly only find out about known unknowns that are of interest to the user (things that the user was unaware of, but of a type which the user was aware of).

As an example, a user wishing to identify a cause of symptoms in a patient who has returned from a tropical location, might suspect they symptoms are caused by a tropical disease. They might define a query as: tropical disease (high divergence) has symptoms X (low divergence), Y (low divergence) and Z (high divergence). The user might be surprised to find the results include an indication that the symptoms are associated with chronic heat exposure (which the algorithm found since 'tropical disease' was given a high divergence, and chronic heat exposure is an illness associated with hot countries). The user has thus been provided with information matching his/her requirement, but which would not have been as likely to have been identified using a conventional approach, since typically 'chronic heat exposure' would not be classed as a disease in a typical medical ontology.

In the plurality of hierarchies, generally each hierarchy defines relationships between a plurality of classes to define a plurality of hierarchical layers/rungs of classes.

The semantic database, generally comprises triples in which there is an object thereof, an instance as a subject thereof, and a predicate defining a relationship between the subject and object. Also generally in some triples the object is a class and the predicate defines that the subject instance is a member of the object class, and generally in other triples the object is an instance and the predicate defines a relationship between the subject instance and the object instance.

Generally the formula is a positive function of the number of rungs that at least one hierarchy of the ontology has above that class, or above the class of that instance. This has the advantage that the user does not need to know the details of the ontology, but simply identifies how much divergence they desire on each class/instance, and the computer can select a sensible amount of broadening, taking into account how much broadening is possible. The term 'rungs' means how many levels up the hierarchy or branch thereof one class is from another class.

This is an improvement on simple prior art approaches where the user can select to broaden, and the computer will allow matching with, for example, the class that is 1 rung higher in the hierarchy.

Preferably the ontology comprises a plurality of hierarchies, and wherein the formula determines the semantic distance between each class/instance in the query that has a non-zero divergence value, and a plurality of classes in the ontology, in each case by:

For the, or each, minimum common class defined in the ontology (the lowest class in a hierarchy under which both the class/instance and the object are located), individual semantic distances are derived from the number of hierarchical rungs upwards from the class/instance to that minimum common class, or a positive function thereof, as a fraction of, the number of hierarchical rungs upwards from the class/instance to the top of that hierarchy, or a positive function thereof, and the individual semantic distances are inverted;

The semantic distance is the inverse of the sum of the inverted individual semantic distances, or is a positive function thereof; and an alternative class in the ontology is accepted as a match to a class/instance in the query, if and only if, it's semantic distance is no higher than the user defined divergence value.

This has the advantage that the formula accounts for ontology structures in which there are multiple hierarchies, and in which there may be multiple ways to find a minimum common class between any two classes in the ontology. This enables the approach to be used when multiple databases with different, potentially conflicting ontologies, are combined, so that the user can search for matches even where the potential matches are based on information that is split between multiple databases of potentially differing types.

Optionally in the step of outputting at least one identified pattern to the user via a user interface, results are presented to the user via a graphical interface, in an order defined at least partly by:

a total divergence value associated with each result, the total divergence value being a positive function of the semantic distances of the respective classes in the result from the respective classes/instances in the query.

This has the benefit that the user can be shown the most relevant results first, taking into account that the user is likely to be most interested in results which are a close match with their query.

Preferably the user search interface is arranged to permit a user to define divergence values for each class permitting at least three values, and the formula accordingly outputs at least three values of allowable semantic distance. More preferably at least five allowable values, and optionally is a continuum of values.

Generally there need not be any limit to the number of divergence values possible (it will typically be possible for the user to select any value within a range, e.g. using a graphical slider bar), however the point is that the user is not constrained to a simple binary 'broaden' vs 'don't broaden' pair of options.

Typically the fact matching the user requirement is one of:
1) the existence, identity, nature or location of a physical object, physical signal or physical substance, or an action of a physical object;
2) the existence, identity, nature or location of a person, or a personal act;
3) the existence, identity, or nature of a clinical condition; or
4) the existence, identity, nature or location of a documented solution.

In the case that the fact is the existence of the thing of interest, rather than its identity or nature or location, the advantage may be that the user is empowered to identify the identity nature or location, however in other examples the advantage may be gained directly by having access to the fact that it exists—as an example if the fact is whether a bridge exists between two islands, then this in isolation may well be adequate for the user's requirement when planning what mode of transport to use to travel between the two islands. Similarly merely knowing that a person matching the requirement exists may be enough to enable a police officer to launch a further investigation. Similarly merely knowing whether a suspect has a gun, may be adequate information for an officer to choose how or whether to go about performing a raid, and thus the user may simply run a query to ask whether that thing exists rather than asking what it's identity or nature is. Similarly merely knowing that a PhD on a topic matching the user's requirement exists, may be enough information for the user to decide not to do their PhD on that topic.

That said, typically if the information provided is only that a thing exists matching the user's query, then often there should be some means by which the user can investigate further, such as the ability to access the raw semantically labelled data that matches the query, document(s), or its location(s) (or usually a pointer to its location(s)) in which the information matching the requirement is contained, or at the least usually the ability for the user to then obtain further information. In many cases in initial search may be done by a user to find out whether something exists, prior to expending effort in searching for information about those things.

By contrast the output of the method may be the document(s) or the location of document(s) where the information matching the query can be found, this may be in the form of a URL pointing the user to a particular document, which may be located on the internet. Indeed preferably the output is both (both the match to the query, and the document(s) or location(s) of the documents containing the text information from which the match was achieved—enabling the user to read what those documents said and form their own view on whether the match was accurate and relevant. Optionally, the semantic database searched by the method may be a semantically labelled version of one or more electronic documents, so the output of the method is either to provide the completed query, or a document or pointer to a document containing that data.

Preferably the output provides the match to the query, as well as information showing how that match was constructed from multiple documents.

Generally, the fact matching the user requirement is the identity or nature, of one of the following:
a) a physical object or substance;
b) an action of a physical object;
c) a signal;
d) a person;
e) an action of a person (e.g. a criminal act);
f) a clinical condition;
g) a clinical treatment;
h) a solution to a problem (e.g. patent searching);
i) a financially stressed customer of one or more finance products (e.g. loan products);

j) a stress factor indicative of financially stressed customers of one or more finance products;

k) a physical product;

l) a financial product; or m) an investment or sales opportunity.

Preferably it may be one of a) to e) (of the above listed option). Alternatively or additionally it may be one off) to g). Alternatively or additionally it may be one of a) or b). Alternatively or additionally it may be one of i), j) or l). Furthermore each of the 8192 possible combinations, including or excluding each of a) to m) above is a separate embodiment.

As an example of identifying a physical object, this might be a hardware component matching certain constraints. For example if a user wants an off the shelf solution to apply decorative lines to a vehicle, the user might define a query such as that: X is a product for a vehicle (high divergence), X is a film, X is arranged as a roll, X is transparent, X has a pattern, the pattern has lines, the roll has a length of at least 0.5 meters, the film is self-adhesive. By repeating the query with various divergence values defined, the user might save themselves the trouble of having a suitable product manufactured, since the algorithm would return results indicating the existence of a 'window privacy' product for internal office windows of meeting rooms, which happens to also be an adhesive roll, and which is mostly transparent with lines on. This would be an example of an unknown unknown (a fact of a type which the user did not know existed, and thus could not have thought to directly search for).

As an example of identifying a person, this might be a criminal who has certain characteristics identified by a victim including an accent of a particular type, and a car and jacket of particular styles. A police officer with access to relevant data would define a query specifying each of the known characteristics, and would vary the divergence accordingly to see what results are returned, potentially identifying the criminal as a suspect. The ability to vary the divergence is valuable because there might be high uncertainty regarding the type of accent or the type of car or jacket style, and it might be for example that actually the car was a modified van, or that the jacket was actually a gilet or a coat. Another, perhaps better, example would be to define a query identifying a known criminal activity, for example using certain type of hardware and software, and visiting certain types of commercial establishments, and performing certain types of criminal activity. By running the search and varying the divergence parameters, the police officer may be able to identify related crimes likely to be performed by the same criminal, which vary in the technical details, but are thematically similar.

A further example, particularly relevant but not exclusively relevant to fraud detection, would be if an investigator created a search query identifying a set of behaviours of an individual who committed fraud, and by varying the divergence on each parameter, the investigator will be returned results matching other cases of fraud where the fraud was committed in a different but related way. This enables the investigator to identify cases of fraud, and to identify fraudulent criminals, who might otherwise go undetected. Again this shows that the approach enables the user to identify unknown unknowns (information of a type which the user would not have known to search directly for).

As an example of identifying a documented solution, a patent searcher might define a query specifying certain characteristics of an invention that he or she is interested in, for example to prove that it is a known invention. By defining a query that has sufficient detail to constrain the context to results that will be of interest, the user is able to vary the divergence on any of the terms to find differently worded but relevant results. As with all of the examples, the formula which relates the user defined divergence to the amount of broadening allowed is key. The user does not usually know how many levels a term (word or phrase defining a class) can be broadened to in the hierarchies that are in the ontology, since this will be different from term to term—merely asking the computer to broaden a term without taking account of this would result in unpredictable effects, such as broadening to far too great a degree, or—more likely—always broadening by only one level, which may not be useful in well defined ontologies with large and highly structured hierarchies.

Figure 11:
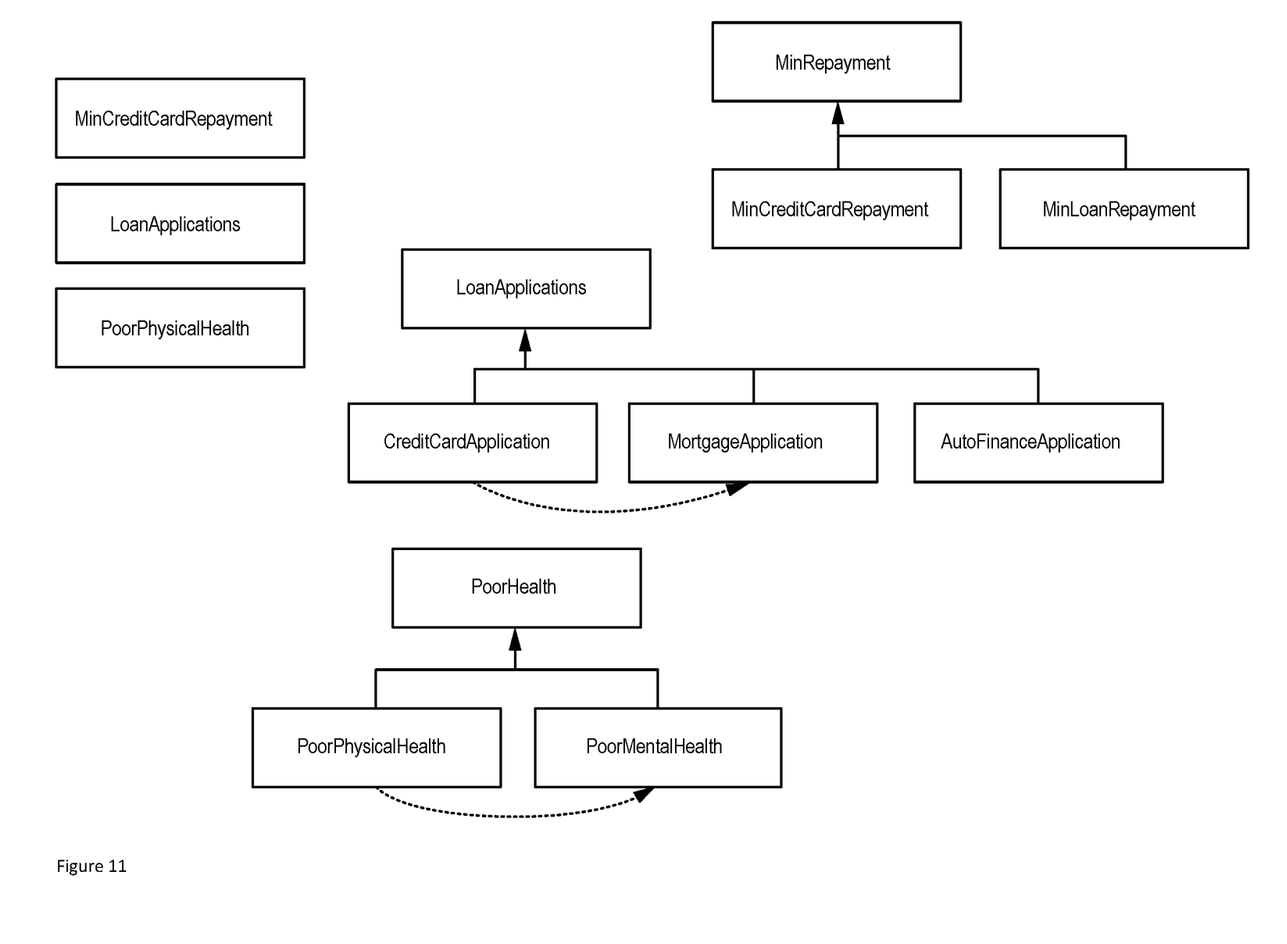
FIG. 11 is a diagram illustrating data in one or more ontologies relevant to a search for stress factors indicative of customers experiencing financial stress.

With reference to FIG. 11 which shows a data structure of objects and their relationships in one or more ontologies, an example is provided below of identifying one or more stress factors associated with financially stressed customers of one or more financial products.

Analyst X is looking for Stress Factors (S) from the financial institution's customer base. He/she identifies 20 customers who have recently defaulted on a financial product such as a loan (C1 . . . C20). When the Stress Factors for these are examined it reveals a combination of MinCreditCardRepayment, LoanApplications, PoorPhysicalHealth as the primary factors which led to customers defaulting. Analyst now uses adds three Stress Factors into a query, and applies a MINIMUM divergence on MinCreditCardRepaymet, MAXIMUM divergence of LoanApplications, and MEDIUM divergence on PoorPhysicalHealth. The relationships between the Customer and these Stress Factors are also defined. The computer apparatus uses the divergence values provided to identify other combinations which could lead to a customer defaulting. Examples of outputs from the computer apparatus include combinations such as {MinCreditCardRepayment, CreditCardApplication and MortgageApplications (diverged from LoanApplications), and PoorMentalHealth (diverged from PoorPhysicalHealth)} which also have high probability of leading a customer to default. The analyst is then able to take the identified but unexpected Stress Factors, and can use them in any suitable computer system (e.g. his/her banking system) to search for customers using the newly identified Stress Factors which could lead to customers defaulting in the future.

This enables the user to intervene to reduce the likelihood of adverse outcomes such as default on a loan product, for example by providing the customer with additional assistance or guidance, for example inviting the customer to discuss a debt management plan, or preventing the customer taking on further loan products.

As an example of identifying the existence, identity or nature of a clinical treatment, a user may input a query defining symptoms of a patient for example shortness of breath. The user initially assumes that this is caused by a lung infection, and thus would be addressed by a suitable antibiotic. The user inputs a query for "X is an antibiotic. X addresses 'shortness of breath'". Before deciding to prescribe antibiotics the user re-runs the search with a high divergence on X, causing the computer apparatus to check any available ontologies and from this/these ontology/ies it identifies that 'antibiotic' can be considered a child of the term 'medication', and accordingly returns different results including that diuretic tablets address 'shortness of breath'. Accordingly the user is prompted to do further research, for example asking a colleague whether this could be relevant to the patient, leading to the realisation that the patient might be experiencing heart failure causing the symptom known as 'water on the lung' which is known to cause shortness of breath. The benefit in this example is that the user is better enable to diagnose and treat the patient leading to potentially improved clinical outcomes.

As an example of identifying the identity of a document, a user might input any type of query for related text for example 'X is a holiday location. X has mountains. X has natural springs. X has a diving school. X is close to Western Europe'. By setting a medium divergence on 'close to' and 'mountains' the computer would check the ontologies available to it, identify that 'stratovolcano' and 'mountain' are within the meaning of 'summit peaked landforms', and identify that 'close to' and 'within' are both within the meaning of 'proximal', leading the computer apparatus to output the URL of a document on the internet discussing the nature, location and holiday amenities of the Azores islands (among potentially other results). The benefit is that the user is able to retrieve and read that document, determine that the Azores are of interest to him/her, and avoid the expense and pollution caused by travelling further than necessary.

As an example of identifying a documented solution, a user might to search literature, for example patent literature, for a way to stop shrapnel, or indeed a way to search documents. The user inputs a query and defines a divergence value for at least one of the terms used, and can then re-run the search with different divergence values. If the user had searched for 'X stops shrapnel better than Kevlar. X is transparent', and set a medium divergence on 'shrapnel' the computer system would check ontologies available to it, and identify that bullets and shrapnel are both military projectiles, and would search in documents available to it, for example online encyclopedias or patent literature databases, and return amongst its results, that high molecular weight polyethylene is transparent, and can stop bullets better than Kevlar. The benefit is that the user is empowered to investigate the suitability of polyethylene and could potentially develop anti-shrapnel windows that might save lives.

As an example of identifying an investment or sales opportunity, a user might search a database of stocks and shares and bonds, including descriptions of them. For example the database might indicate that a particular share has a tendency to decrease in price when the price of gold increases, and that it has historically paid dividends annually. By inputting a query for the characteristics of the investment or sales opportunity that the user wishes to learn of, the computer apparatus searches for and retrieves matching financial products. By broadening the divergence on a term such as 'share' the computer system may retrieve investment or sales opportunities of interest to the user which are not strictly company shares, such as securities in mutual funds, or options to sell shares, depending how high the divergence value is set by the user. This enables the user to find investment or sales opportunities that suit him or her.

Preferably the user search interface is arranged to permit a user to define divergence values for each class permitting at least three values, and wherein the query defines at least three classes that have different values from each other.

This is particularly advantageous because it gives the user the ability to adjust the breadth to a greater or lesser degree, offering the ability for the user to tweak the query so that it produces more useful results. The inventor has found this to generate significantly improved outcomes.

Preferably the user search interface is arranged to permit substantially any value within a predetermined range of values to be defined as a divergence value by the user. This is preferred as it gives the user greatest control over how broadly a term should be expanded, reflecting that the user's confidence in the query terminology varies from term to term and is not restricted to two or three possible levels of certainty. This may be implemented via a graphical slider selector/indicator against each term in the query, or may be implemented by requiring the user to type in a number, for example between 0 and 1, or between 0 and 100.

Whilst one option is to provide a semantic database, and the output would be a matching statement. Another option is to convert multiple text documents or multiple sections of text (E.g. sentences, paragraphs, pages, chapters etc) generally keeping note of where the instances and relationships were obtained from within that/those documents, and then the output might be a link to the relevant document, or section of text. Of course ideally the statement is outputted additionally with a link (e.g. hyperlink) to the relevant documents or locations or perhaps a diagram is provided identifying from what text information, each of the interrelationships was generated, such that the user can see how the matching statement was constructed from multiple documents or multiple sections of text. In the simplest example however, especially where the statement was obtained from a single document, e.g. a webpage or pdf file in a directory or intranet or on the internet, the user might simply be provided with a link to that document.

The term text document includes documents that also contain non-text content, such as is generally the case with html and pdf documents.

According to a second aspect of the present invention there is provided a computer apparatus comprising data storage medium comprising computer instructions, and a computer processor arranged to perform the computer instructions, wherein the computer instructions are arranged to control the computer processor to perform the computer implemented method of the first aspect.

According to a third aspect of the present invention there is provided a computer program comprising the computer instructions set out in the second aspect.

Embodiments of the invention will now be described with reference to the accompanying figures, in which.

Referring to the figures, embodiments of the invention are described below, involving a Semantic Search Algorithm (SSA) which enables the user to explore patterns in text information and aids in the discovery of unknowns from structured information in a semantic knowledge base. A semantic knowledge base or semantic database means a database of linked concepts, where each concept is labelled according to an ontology so that its meaning is clear. The SSA will also herein be described as the Information Collider (ICOL) Divergence Algorithm or just ICOL Algorithm. The ICOL Algorithm is one component of the ICOL System depicted in FIG. 9 as an exemplar.

ICOL Algorithm divergence exploits the inherent database structures through which organisations store information and combines this semantic knowledge with user preference to derive conclusions. Users can submit incomplete search patterns along with at least one divergence value as input into the ICOL algorithm, and get reformulated patterns returned which inform them about the unknowns within their databases.

An incomplete pattern is a machine-understandable information structure which consists of a set of nodes (also described herein as classes and in some cases as instances of classes) (these are the key considerations of a search) and their relationships, in addition to at least one divergence value corresponding to one or more of the nodes, and optionally an initial value for one or more of the nodes.

Figure 1:
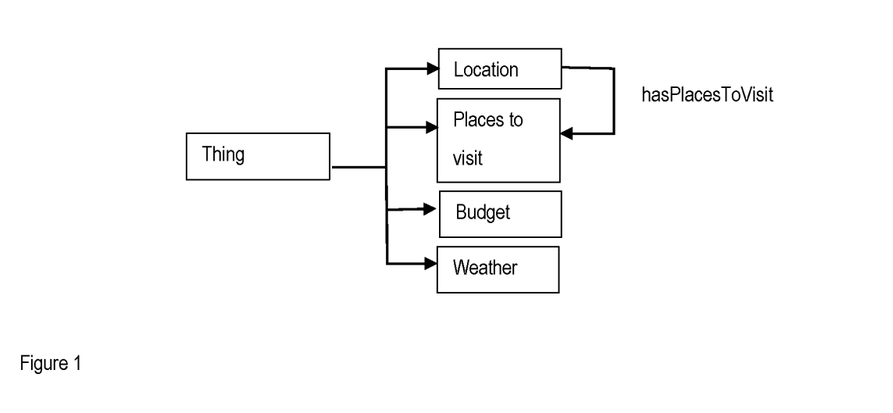
FIG. 1 shows an ontology suitable for use with an embodiment of the invention.
Figure 2:
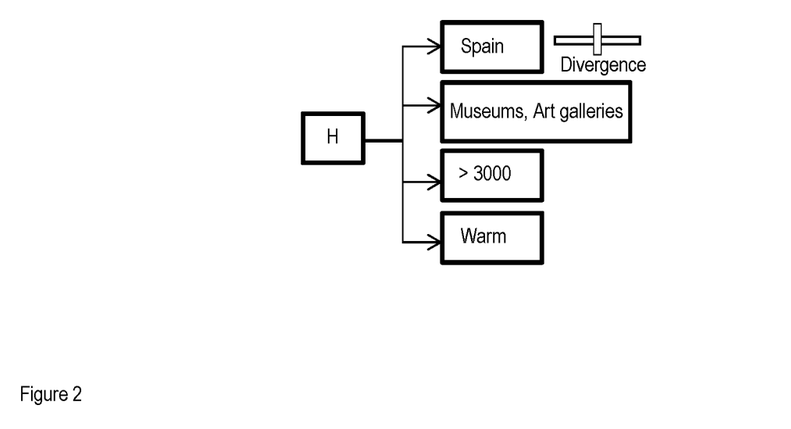
FIG. 2 shows how an incomplete pattern including nodes and divergence values for nodes can be constructed for the ontology in FIG. 1.

The principle of the invention will be described with reference to FIG. 1 and FIG. 2. FIG. 1 shows an example of an incomplete search pattern for a holiday. The holiday planning operation which may include the nodes (weather, location, budget, places to see, health factors etc.). The incomplete search pattern relating to a Holiday might have four nodes, namely Location, Places to Visit, Budget and Weather. In FIG. 2, the four nodes have been populated with initial values, and the top node (Location) has also had a divergence value specified. It is implicit that the bottom three nodes have a divergence value indicating that no divergence is permitted (E.g. a value of zero) because they have not had a specific divergence value applied to them.

Divergence is a way of specifying user preference to the ICOL divergence algorithm. Low divergence means strong preference for that node and vice versa. In the holiday planning example shown in FIG. 1 and FIG. 2, setting minimum (E.g. no) divergence on {Weather=WARM} means the algorithm will definitely look for warm weather locations. With reference to FIG. 2, setting a medium divergence on {Location=SPAIN} would lead to algorithm looking for other WARM locations which are similar to Spain (e.g. Mediterranean countries or perhaps Spanish language countries, depending how the ontology/ies is/are structured). Increasing the divergence of {Location=SPAIN} to a maximum value would result in the algorithm looking for all warm countries within the specified budget and which have the relevant places to visit.

In practice, divergence values can be input or modified through any means for receiving a divergence value, including a slider to modify the value, scroll boxes to increment or decrement a number, or a free text input box, or command line input, or any other known means for adjusting the value of a property within software. The exact mechanism for receiving the divergence value is not important but means should be present for receiving at least one divergence value within the incomplete pattern (E.g. others would remain at a default value).

Once all the nodes, relationships, and divergences for an incomplete pattern have been defined, the ICOL System performs pattern matching to explore the database structure and finds matching patterns. These are semantically similar and match the user preference. The ability to capture precise semantics (objective) and the user's preference (subjective) within the same pattern, and to explore information with the captured incomplete pattern is the novelty of this research and goes beyond what is currently possible with keyword and precise semantic searches.

Generally, a divergence value is associated with at least one node of the incomplete pattern. One or more of the nodes may have a divergence value associated with them, but each node can only have one divergence value in any particular search (but may be varied to re-run the search). Notionally the divergence is specified on a scale of 0 to 1, with zero being no divergence and 1 being maximum divergence but any scale can be used, e.g. a percentage, or even grades such as high, medium, low, or letters A to E for example.

If a node does not have a divergence value set, this should generally be taken to mean the allowable divergence on that node is zero, i.e. only classes matching or beneath than that node in the ontology (sub-classes, sub-sub classes etc) will be returned as a "match". This is the conventional behaviour that one would expect when searching, i.e. only return classes matching the node, or any item sitting underneath that class.

Each node in the incomplete pattern may optionally have an initial value specified, but at least one node (e.g. location) in the incomplete pattern should have an initial value (e.g. Spain) specified by the user.

Thus the incomplete pattern should be understood to comprise at least two nodes, having a defined relationship between them, and at least one divergence value associated with one of these nodes, and an initial (non-default) value for at least one of the nodes.

In an embodiment of the invention, the algorithm receives a semantic query/incomplete pattern where Objects (nodes) of specified type (aka class) have Interactions with one or more other Object(s) of specified type (aka class). (For example people interacting with equipment—e.g. "Macintosh (class: computer) has mouse (class: pointing device) and has keyboard (class: input device");

The user is provided with a means (either through a visual interaction tool (e.g. a slider in the browser/software window) or through programmatic configuration giving the user the choice to indicate a higher or lower amount of "Divergence" being acceptable, for at least one parameter of the user's semantic query.

The algorithm then searches the database for patterns falling within the definition given by the incomplete query. Where the user has indicated non-zero divergence as acceptable for certain nodes of the incomplete pattern, then a different or broader concept in the database is accepted as a match, provided that that different concept has a semantic label that indicates (optionally by reference to a semantic data look up reference resource) that it has a meaning with a different but overlapping breadth (e.g. it could be required to be broader, or narrower, or alternatively either could be allowable) than that user defined term. The degree to which broader or different terms are considered a match is dependent on the divergence value given, the ontology/ies provided, and the formula. The formula provides a predefined relationship between the user's divergence value, and how much higher up the relevant part of the ontology/ies that matches are allowed to be found.

The algorithm then provides any matching semantic patterns to the user.

The invention provides the ability to search and discover unknowns from semantic databases by introducing uncertainty in search query patterns through the use of divergence values. Traditionally, semantic searching is deterministic—in the sense that the answer is either 1 (if results are found) or 0 (if there are no results) against a specific query. Keyword based searches on the other hand are purely based on string matching and do not maintain the context of the search (i.e. interaction between the objects).

The invention permits new patterns to be discovered whilst maintaining the context of the search, i.e whilst retaining the crucial relationship information between the nodes in the incomplete pattern. As such the invention provides a way to search of a semantic database by retaining the relationship information between the semantic nodes of the incomplete pattern whilst permitting a divergence to be specified for one or more of the nodes, rather than considering the nodes rigidly and in isolation from one another.

The invention permits the user to make a conscious decision on how broad or narrow a term to use for each node in their query, and enables them to made a deliberate decision for each of the nodes (or at least one of the nodes) as to whether terms that are broader than their chosen term are acceptable matches in the output patterns. Conventional searches are unable to return broader results, because they do not encompass the concept of divergence and thus only return narrower or equal results. Conventional searches also do not permit the user to specify the acceptable amount of broadness (if any) for each individual node within the incomplete pattern. This is particularly useful, for example permitting the operator to prevent results being returned which are broader for certain nodes, but which are broader for other nodes within the incomplete pattern.

First Embodiment

Figure 3:
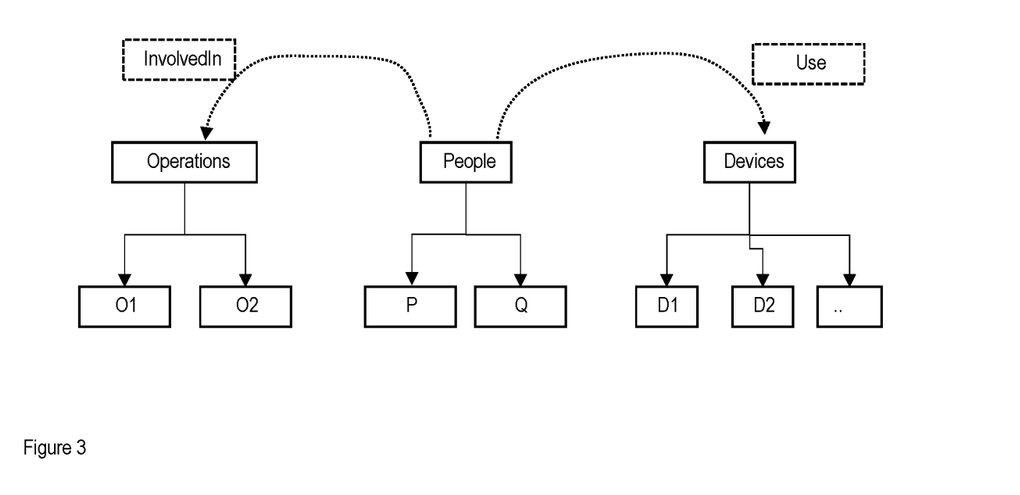
FIG. 3 shows an ontology relating a first embodiment.
Figure 4:
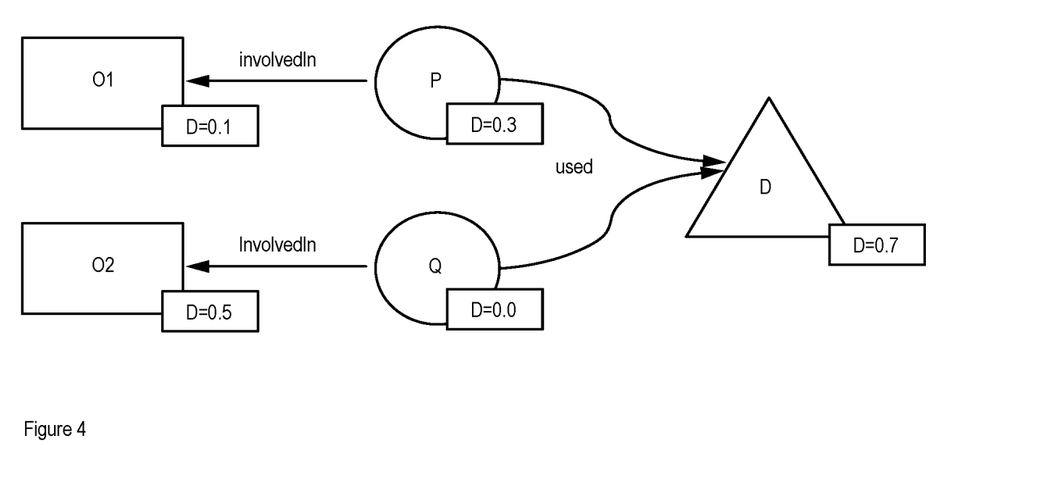
FIG. 4 shows how an incomplete pattern including divergence values and initial values can be specified for the ontology of FIG. 3.

FIG. 3 and FIG. 4 relate to a first embodiment of the invention.

FIG. 3 shows an ontology upon which a search is conducted. There are three separate hierarchies shown, relating to Operations, People and Devices, though the skilled person will appreciate these hierarchies would all normally be part of a one or more—much—larger (more comprehensive) ontologies. The relationships are shown in dotted lines and captured in the dotted boxes—in this example People are InvolvedIn Operations and Use Devices. Thus in this embodiment People are defined as interacting with other People through the use of a particular specialism of Device (e.g. a mobile phone, computer etc.).

The results obtained from a keyword search of the ontology in FIG. 3 would result in all matches for the text in any of the objects without maintaining the context or the meaning of the query which is captured via the interaction between the objects. For example: searching for any specific device "samsung phone" ™ or an operation "looting" will result in all documents containing those terms regardless of whether they are related or not. The results obtained from a precise semantic search for the above query would only return exact matches if there are any. For example: a semantic search for "Person X involvedIn Looting Y using a Hand Gun Z" will return results where an exact match of this interaction has been recorded earlier in the semantic database or return no results if the exact match has not been found.

FIG. 4 shows how an incomplete pattern including divergence values can be built up and used as an input to the ICOL.

For example the user can generate an incomplete pattern, wanting to find all instances where Person (P) involved in Operation of type (O1) has interacted with Person (Q) involved in Operation of type (O2) and used Device (D) for the interaction.

The user inputs a divergence value on one or more of the nodes. In this embodiment, the divergence value is a numerical value between 0 and 1 and allows users to specify the amount of uncertainty they have on each object within the incomplete pattern. A value of 0 indicates that they would only like to look for either the exact object or specialisations of that object (e.g. O1 is a specialisation of Operations, just as Human is a specialisation of Mammal). A divergence value greater than 0 would indicate that the user is uncertain of the object within the query pattern and the algorithm would replace the object in the original query with broader concepts whilst still maintaining the context (e.g. Living Being is a broader concept of Mammal). This way, the algorithm discovers similar reformulated patterns to the original incomplete pattern.

This method of search and discovery allows users to quickly discover previously unseen or unknown knowledge even when the user is uncertain about the exact thing they are looking for. Divergence enables users to express their searches approximately and the algorithm does the job of finding compatible results based on the divergence values expressed on objects within the query.

With reference to FIG. 4, the user specifies a divergence of 0.1 on O1, 0.3 on P, 0.7 on D, 0.0 on Q, and 0.5 on O2. In this example, the 0.7 divergence on P means that via the formula, acceptable matches for this note include not only the class and sub-classes, but also broader classes too, up to a predetermined breadth defined by the formula. The 0.0. value on Q means that only Q or items lower in the ontology than Q will be included. This is very useful, for example where the user wants some nodes in the pattern to be exact matches but wants to explore dissimilar results (of varying degrees) for other nodes in the search pattern. For example, the searcher may only be interested in Device D1, and person P, but interested in all Operations P has been involved in using D1. Alternatively, the searcher may want to run a search where they are only interested in Operation O2, but interested in all Persons and all the different devices that may have been used.

By considering and setting the divergence value of each node in the incomplete pattern, previously unknown patterns can be discovered. As previously discussed, nodes without a divergence value are equivalent to a node with a divergence value of 0 (or whatever value has been configured to correspond to "no divergence").

Common to all embodiments, the first step in using the divergence algorithm is to define an incomplete pattern. It is a sometimes called a seed incomplete pattern or seed pattern because it forms the query a user submits into the ICOL Algorithm.

Figure 5:
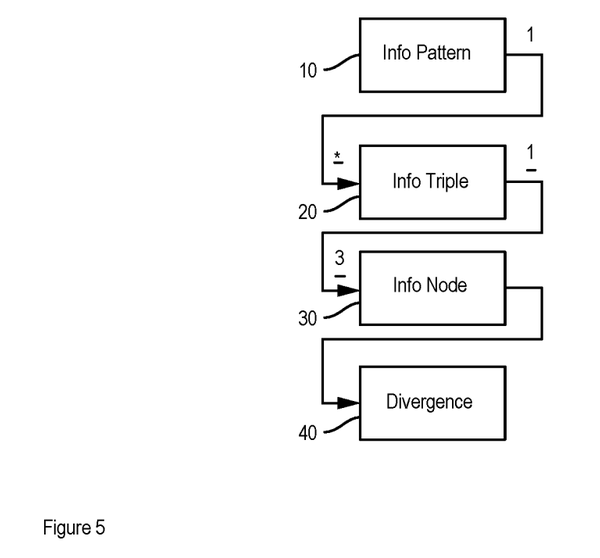
FIG. 5 shows an example of a seed incomplete pattern, embodied within an Information Collider Query Language (ICQL) Object.

FIG. 5 specifies an incomplete pattern, expressed in the form of an Information Collider Query Language (ICQL) Object. An incomplete pattern is generally a graph query (meaning that pairs of concepts in the query are explicitly linked by defined relationships) consisting of one or more divergence values (user preference) on top of a SPARQL™ query Since SPARQL™ only allows the inclusion of Classes, and Properties, a new or modified query language (E.g. ICQL, Information Collider Query Language) is desirable to handle the inclusion of divergence values over SPARQL™ nodes.

With reference to FIG. 5, ICQL consists of three main types of objects: InfoPattern 10, InfoTriple 20 and InfoNode 30.

The InfoPattern 10 (incomplete pattern) comprises at least one InfoTriple 20, and typically several or many. Each InfoTriple 20 captures two nodes (two InfoNode 30) and the relationship between them. The InfoNode 30 may have a Divergence Value 40 associated with the InfoNode 30, and may hold an Initial Value for the InfoNode 30.

The InfoPattern 10 may have multiple InfoTriples 20 associated with it, with the most simple query being an InfoPattern 10 with a single InfoTriple 20, of which at least one InfoNode 30 has a Divergence Value 40 and at least one InfoNode 30 has an Initial Value (i.e. a default value, typically indicating that no divergence is permitted).

In an embodiment of the invention, an InfoNode 10 object has the following properties:

1. Type—The Class or Property in the ontology.
2. Value—a variable name for Type
3. RequireVar—a Boolean flag which indicates if a Value (2) is required. Properties do not require variable names.
4. Divergence value 40—optional—a double value which specifies divergence (a number between 0 and 1)

An InfoTriple object consists of 3 InfoNode objects:

1. Subject—subject of the RDF Triple
2. Predicate—predicate of the RDF Triple (these are Properties)
3. Object—object of the RDF Triple An InfoPattern object is composed of the following:

1. Type—Specialisation or Abstraction.
2. Id—Unique identifier.
3. Namespaces—ontology prefixes necessary for namespace resolution within SPARQL.
4. Triples—a list of one or more InfoTriple objects 20.
5. CounterType—RESULT_COUNT_TYPE or SEMANTIC_DISTANCE_TYPE.
6. Rank—computed rank for the pattern.

Each InfoPattern 10 object can be converted into SPARQL™ query. A translator function provides one to one mapping between InfoPattern Objects 10 and SPARQL™ variables.

The input to the ICOL algorithm is an InfoPattern Object 10 (seed incomplete pattern, i.e. knowns). The output from the ICOL Algorithm is one or more InfoPattern Object(s) 10 (reformulated patterns, i.e. the unknowns). Counter Type is a variable within the InfoPattern object 10 which specifies how the Algorithm should rank the results once the incomplete pattern has been submitted. RESULT_COUNT_TYPE does a SPARQL™ search for each returned result and ranks results based on the number of instances retrieved from the database against the query. SEMANTIC_DISTANCE_TYPE ranks the results based on the total semantic distance between the seed pattern to the resultant patterns.

Semantic Distance

Semantic Distance is a way of quantifying the difference between two concepts within an ontology.

In an embodiment of the invention, semantic distance may be calculated twofold. First, for each node in the incomplete pattern, a Semantic Node Distance is defined that looks at what other possible nodes that node might become and assigns a numerical score to them (from 0 to infinity, where 0 means that the underlying semantics has not shifted.) Then, given these node distances and the corresponding user-specified divergences on those nodes, a Semantic Pattern Distance is constructed that gives a meaningful quantification of how different each output of the Collider is from the input.

Semantic Node Distance and Semantic Pattern Distance are calculated as follows.

Semantic Node Distance

Figure 6:
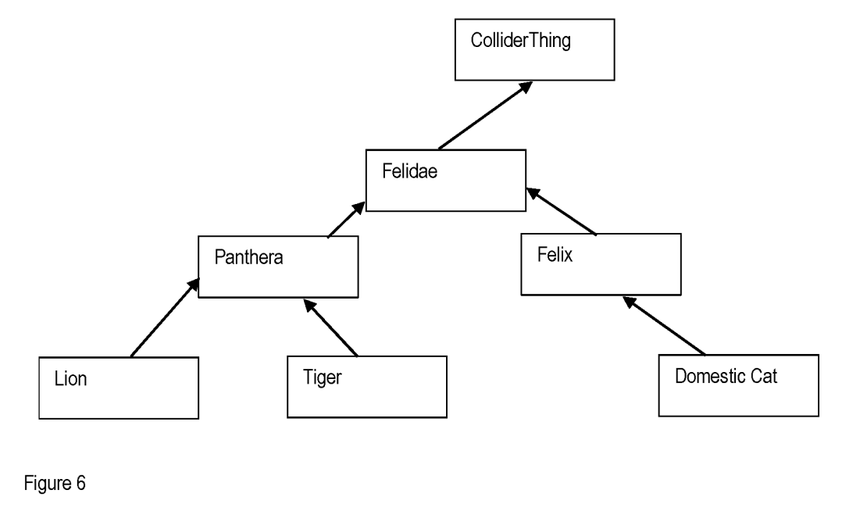
FIG. 6 shows a simplified hierarchy of cats, from which a method a calculating semantic distance can be shown.

The Semantic Distance between two nodes in the ontology (i.e. a Semantic Node Distance) can be calculated as follows:

With reference to FIG. 6, in a mono-hierarchal ontology (each element belongs to only one category), the semantic distance from a node A to a node B is the number of levels up from A you must go in order to arrive at the least common superclass of A and B. For example, in the mono-hierarchal Tree of Life shown in FIG. 6 the distance from the species of lion to the domestic cat would be 2, as they both belong to the same family (Felidae) but do not belong to the same genus.

This Semantic Distance is not symmetric: the Semantic Distance from the order Felidae to the domestic cat is 0, as the cat is directly a member of Felidae whereas the Semantic Distance from the domesticcat to Felidae is 2.

In ontologies with multiple inheritance, two nodes may be linked by more than one most least common superclass. To deal with this, the Semantic Distance as above through each of the links is found (the distance up to each least common superclass), this is inverted to get a measure for semantic closeness, the semantic closenesses for each link are summed to get a total measure of closeness, and the result is re-inverted to get a total measure of Semantic Distance.

For instance, if nodes N and M were both a member of nodes A, B, and C, with semantic distances from N to those categories a, b, and c respectively, then the total Semantic Distance d from N to M would be:

$$d = \left(\frac{1}{a} + \frac{1}{b} + \frac{1}{c}\right)^{-1}$$

Semantic Pattern Distance

Semantic Distance between two patterns (P1,P2) is the sum of weighted Semantic Distances from the individual nodes of the source pattern to the corresponding individual nodes of the reformulated pattern, where our weight w for a node is calculated from the formula w=—log 2(d) where d is the divergence for that node.

The reason this formula is used is that a divergence approaching 0.0 will cause a weighting approaching infinity as the desire for abstraction is minimised, whereas a divergence of 1.0 causes a weight of 0, so the pattern will consider all nodes in the graph for this entry equally. A divergence of 0.5 causes a 'standard weight' of 1. Mathematically, w represents how 'surprised' we would be that such a change has been made to the pattern (the information entropy of the change), given our uncertainty as to whether a change should be made at all (the divergence).

However it should be noted that if a node's Semantic Distance is 0 (i.e. it is a direct specialisation of the seed (query) node), its weighted Semantic Distance will also be 0, even if the divergence on the seed node is 0.

Abstraction Based On Divergence

The level of abstraction (how far up the ontology we consider results) is dependent upon the divergence placed on the node. With reference to FIG. 6, this calculation can be done as follows:

Given a node N and a divergence v, for each node X in the ontology such that X is (directly or indirectly) a superclass of N, we calculate the distance $d_1$ from N up to X, and also the distance d2 from X up to the most generic node in the ontology (ColliderThing). Then if $d1 \leq v*(d1+d2)$, we consider the node X close enough to N to be included in the abstraction (we also obviously consider the node N to be included in its own abstraction).

Then, for every node included in the abstraction for N, the algorithm looks at all possible (direct or indirect) subclasses of that node.

With continuing reference to FIG. 6, in this example, our seed node is "Lion", with a divergence of 0.5. Our possible nodes for X are Lion, Panthera, Felidae and ColliderThing.

Looking at Panthera, we calculate $d_1=1$ and $d_2=2$. Since $1 \leq 0.5*(1+2)$, we do consider Panthera in our abstraction.

Looking at Felidae, we calculate $d_1=2$ and $d_2=1$. Since $2 > 0.5*(2+1)$, we do not consider Felidae in our abstraction.

Therefore the Divergence Algorithm will look at Lion, Panthera, and Tiger as possible nodes for the reformulated pattern. If the divergence on the seed node Lion was increased to 0.7, then Felidae, Felix and Domestic Cat would also be in that list.

ICQL—Incomplete Pattern Example

Figure 7:
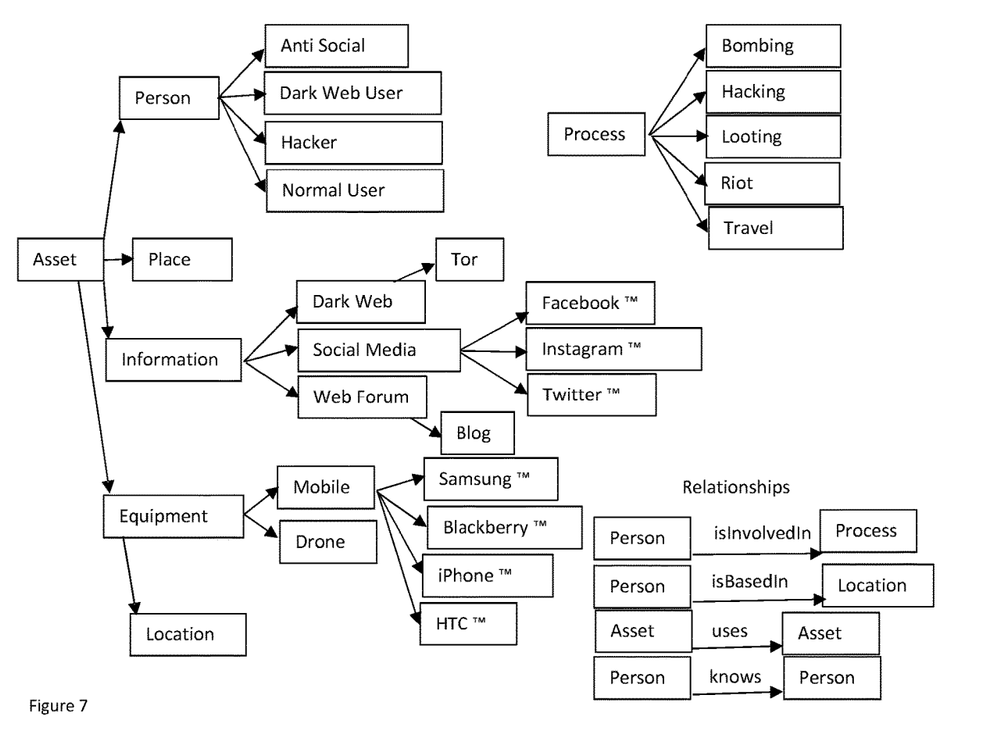
FIG. 7 shows a People, Information, Places, Locations and Processes ontology structure relating to a second embodiment.
Figure 8:
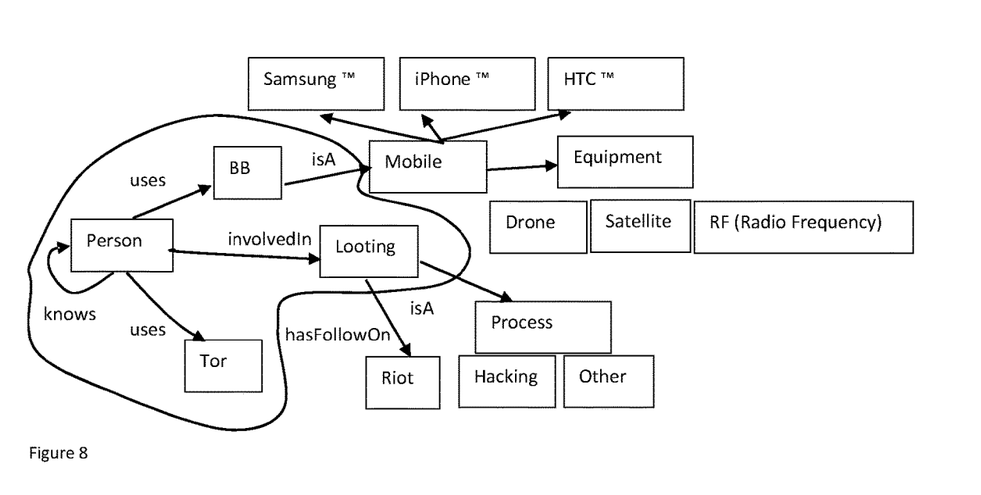
FIG. 8 shows an Abstraction Pattern example using the ontology of the FIG. 7.

With reference to FIG. 7 and FIG. 8 a second embodiment of the invention will now be described.

With reference to FIG. 7, consider an ontology describing People, Information, Places, Equipment, Locations and Processes. and the depicted subclass hierarchies and relationships.

Given the above ontology, if we first consider an abstraction pattern, the natural language description for the incomplete seed pattern could be:

"I know from previous reporting that People (D=0.0) are using BlackBerry devices (D=0.7) and Tor (D=0.0) to perform activity Looting (D=0.5). Find me similar patterns based on this."

D indicates the divergence value for the node within the pattern. From the above abstraction pattern, Tor and People nodes will not be abstracted (as D is set to 0.0). However, Blackberry and Looting nodes will be abstracted.

FIG. 8 shows the diagrammatic representation of such an abstraction pattern in relation to the ontology of FIG. 7

Reformulated patterns returned from the divergence algorithm could look like:

People are using Samsung mobiles on Tor to perform Looting related activities.

Hackers are using HTC devices on Tor to perform Hacking related activities.

Dark Web Users are using Drones and Tor to perform Riot related activities.

Note that because Tor has no subclasses and the divergence on it is set to 0.0, it will occur in every pattern returned by the Algorithm. Because the divergence on People is set to 0.0, every pattern returned by the Algorithm will contain a subclass of People (in these cases, Hackers, Dark Web Users, or People itself). However, because the divergence on Looting is nonzero, the Algorithm will return abstractions such as Hacking, which is neither Looting nor a specific type of looting.

Figure 10:
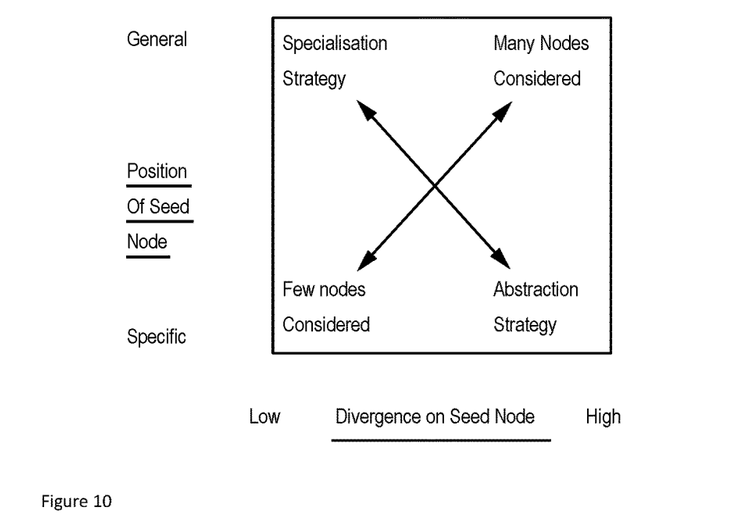
FIG. 10 is a diagram illustrating a relationship between position of seed node vs divergence of seed node.

When performing an 'abstraction-type' search, is advantageous that the user should define a seed (query) pattern input that is as specific as possible and a relatively high divergence should be set on each node. The algorithm will then output results (reformulated patterns) that are similar in a variety of different ways to the user's incomplete pattern. This is appropriate when looking for similar results but it is known the way in which they are desired to be similar: for example, to look for people who may be connected in some way to an organisation, even if they are not yet known to be members. This is illustrated in FIG. 10.

It is also possible to perform a 'specialisation-type' search (broad search terms with narrow divergence values), however the formula provides the greatest benefit when either abstraction is used, and especially so when a mix of abstraction and specialisation is used (some nodes in the query are narrowly defined with high divergence, and some are broadly defined with narrow divergence). This enables the user to better define the context of the search, so that very different results can be obtain but still constrained by the context of the user's search pattern.

Ranking Results:

Given an incomplete pattern with divergences on each node, the ICOL Algorithm outputs a list of reformulated patterns together with their Result Counts (how many hits there are when you search for them in the database) and/or their Semantic Pattern Distances. The results can be easily ranked, by their Result Count, their Semantic Pattern Distance, or any measure constructed from the both of them that is considered appropriate for the specific use case. In general, when looking at patterns that are mostly Specialisation (that is, lots of very general seed nodes together with very low or zero divergences on each node), ranking by Result Count tends to be more appropriate, as many patterns with a Semantic Pattern Distance of 0 that are direct specialisations of the seed pattern will be considered in the results. When looking at patterns that are mostly Abstraction (lots of very specific seed nodes together with higher divergences on each node), ranking by Semantic Pattern Distance tends to be more appropriate as we are looking for results from the database that most closely match our input.

Implementation

The ICOL can be run on a local database, which may be a snapshot of database (i.e. not live). It can be provided as standalone piece of software. The ICOL can be used to build up incomplete patterns and applied to one or more databases. Optionally the database and ontology may be converted into a format suitable for running the ICOL.

Figure 9:
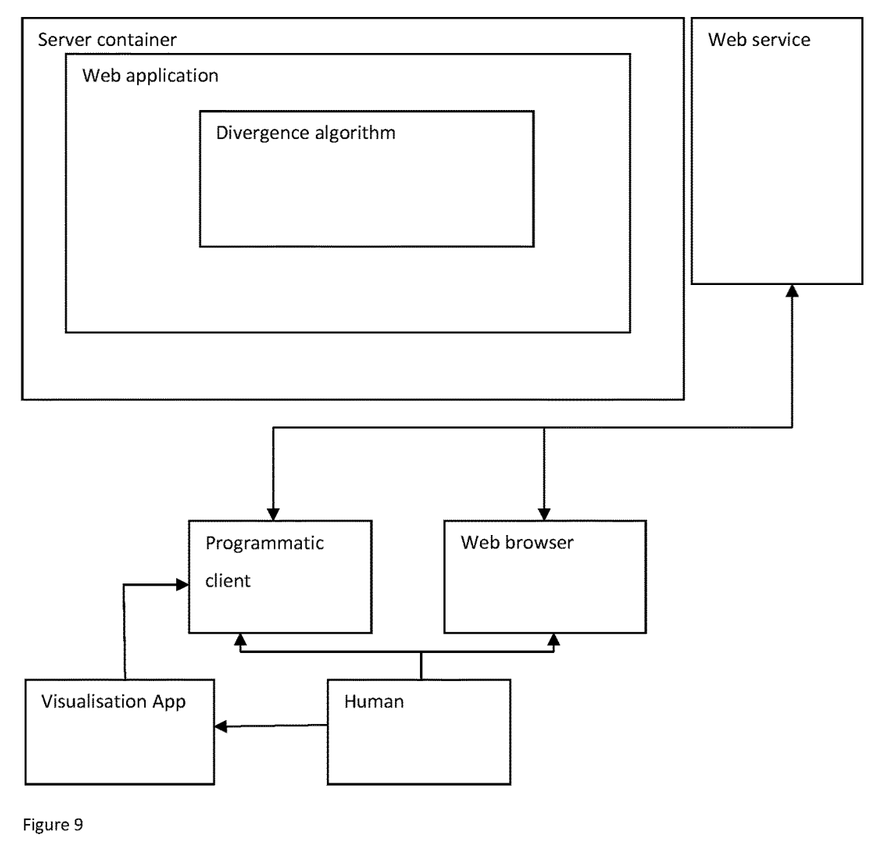
FIG. 9 shows one possible implementation of the ICOL system.

FIG. 9 shows one possible architecture of the implemented system. A Server container contains a web application which contains the divergence algorithm. This provides access to a webservice to users via their web browser or programmatic client, and a visualisation app is implemented on the client side to show the results of the user's query.

Generally speaking there is provided a computer implemented method of determining a fact matching a user requirement, comprising the steps of: 1) providing an ontology, a semantic database comprising triples, a formula defining a maximum allowable semantic distance being, a function of a user defined amount of broadness and of how many hierarchical rungs exist above the relevant_class; 2) providing a user search interface for accepting a graph query defining amounts of allowable broadness; 3) modifying the graph query using the formula; and 4) identify and outputting a matching patterns defining a statement identifying a fact matching a user requirement. This allows the user to discover facts matching the user's requirement, regarding which the user may not have thought to search more directly for, whilst still enabling the user to constrain the context of their search to constrain the number of false positives in the search results Divergence Algorithm Pseudo Code Herewith is pseudo code for an embodiment of the invention.

1. Get InfoTriple objects {T1 . . . Tn} for a given incomplete seed pattern P a. For each InfoTriple T:
   i. Get InfoNode {N1, N2, N3} in T where N1=Subject, N2=Predicate, N3=Object
   ii. For N in {N1, N3}:
   iii. Create class map M of all superclasses of N.
   iv. For each class S in M, calculate how close S is to N, and compare with the divergence on N to determine whether or not it should be considered by the algorithm.
   v. Delete classes that should not be considered from the class map.
b. Now add to map M all subclasses of all classes in M. This is our final map of all nodes that can be reached by the algorithm.
c. Given class map M and seed pattern P:
   i. Find all combinations of values for each InfoNode X within M with the use of a recursive list combination generator algorithm $C_{map}=\{C_1 \ldots C_n\}$
d. For each combination in $C_{map}$:
   i. Map C to a new InfoPattern P* using a mapToPattern( ) function—this function maintains the positions of InfoNodes within the original seed pattern and makes sure the reformulated patterns maintain the same order. Hence the context is maintained.
2. Send reformulated pattern list to a ranking routine:
   a. If (Ranking==RESULT_COUNT)
      i. Translate each reformulated pattern into SPARQL and rank according to number of results retrieved from triple store.
   b. If(Ranking==SEMANTIC DISTANCE)
      i. Calculate semantic pattern distance between seed pattern P and every reformulated pattern P* and rank results based on semantic distance.

According to an aspect, there is provided a computer implemented method of determining a fact matching a user requirement, comprising the steps of:
providing an ontology;
providing a semantic database;
controlling a computer processor to perform the steps of:
    accepting via a user search interface a query, wherein the query comprises a plurality of classes, and/or instances having respective classes, and defines relationships between pairs of them to define a template for a statement regarding a fact;
    identifying patterns of instances and their interrelationships that match the query in the semantic database; and
    outputting at least one such identified pattern to the user via a user interface, defining a statement identifying a fact matching the user requirement;
Characterised in that:
a formula is provided defining a maximum semantic distance up a hierarchy that a class or instance may be broadened to, being a positive function of an amount of allowable broadness (divergence value) defined by a user in respect of that class or instance;
the query defines a non-zero divergence value for at least one of the classes/instances; and
in identifying patterns, for each instance/class having a non-zero divergence value, one or more broader classes of the ontology is also treated as a match, in accordance with the formula.

Any embodiment described herein may be combined with the above aspect. In addition, the fact matching the user requirement may be one of:

the existence, identity, nature or location of a physical object, physical signal or physical substance, or an action of a physical object;
the existence, identity, nature or location of a person, or a personal act;
the existence, identity, or nature of a clinical condition; or
the existence, identity, nature or location of a documented solution.

The fact matching the user requirement may be the existence, identity, nature or location of a person, or a personal act.

The fact matching the user requirement may be the existence, identity, nature or location of a criminal, or a criminal act. The fact matching the user requirement may be the existence, identity, nature or location of a documented solution. The fact matching the user requirement may be the nature of a documented technical solution to a technical problem.

The fact matching the user requirement may be the identity of a clinical condition, such as to present to the user a potential clinical diagnosis that could be made by the user.

The fact matching the user requirement may be the existence, identity, nature or location of a physical object, physical signal or physical substance, or an action of a physical object.

According to another aspect there is provided a computer implemented method of determining a fact matching a user requirement, comprising the steps of:
providing an ontology;
either:
    providing a semantic database; or
    converting one or more text document(s) to generate a semantic database comprising instances and interrelationships;
controlling a computer processor to perform the steps of:
    accepting via a user search interface a query, wherein the query comprises a plurality of classes, and/or instances having respective classes, and defines relationships between pairs of them to define a template for a statement regarding a fact;
    identifying patterns of instances and their interrelationships that match the query in the semantic database; and
    outputting either:
        at least one such identified pattern to the user via a user interface, defining a statement identifying a fact matching the user requirement; or
        the text documents(s) or the location or locations, of the text document(s), from which the instances and interrelationships of at least one statement identifying a fact matching the user requirement, were generated;
Characterised in that:
a formula is provided defining a maximum semantic distance up a hierarchy that a class or instance may be broadened to, being a positive function of an amount of allowable broadness (divergence value) defined by a user in respect of that class or instance;
the query defines a non-zero divergence value for at least one of the classes/instances; and
in identifying patterns, for each instance/class having a non-zero divergence value, one or more broader classes of the ontology is also treated as a match, in accordance with the formula.

More generally, there is provided a computer implemented method of determining a fact matching a user requirement, comprising the steps of providing an ontology and a semantic database, and controlling a computer processor to perform the steps of accepting a query defining a template for a statement regarding a fact, identifying matching patterns in the semantic database, and outputting either a matching statement or information supporting the user to locate corresponding information, Characterised in that a formula is provided defining a maximum semantic distance that a class or instance may be broadened to, and in identifying patterns, for each instance/class having a non-zero divergence value, one or more broader classes is accordingly treated as a match.

The invention claimed is:

1. A computer implemented method of determining a fact matching a user requirement, the method comprising:
   providing an ontology comprising a plurality of hierarchies;
   providing a semantic database comprising instances and interrelationships between text documents;
   accepting, via a user search interface, a query that comprises a plurality of classes and instances having respective classes, and defines relationships between pairs of classes;
   identifying, from the semantic database, patterns of instances and associated interrelationships that match the query, the identifying comprising:
      determining a maximum semantic distance up a hierarchy to which a class may be broadened that and is a positive function of a divergence value corresponding to that class;
      determining a positive function of a number of hierarchical rungs from within at least one hierarchy of the ontology above the class;
      determining semantic distances between classes in the query that have a non-zero divergence value and other classes of the plurality of classes, by, for each minimum common class defined in the ontology:
         (a) deriving the semantic distances from the number of hierarchical rungs upwards from the class to the minimum common class or as a fraction of the number of hierarchical rungs upwards from the class to a top of that hierarchy, and
         (b) inverting one or more of the semantic distances, wherein a minimum common subclass is a lowest class in a hierarchy in which both the class and an object are located, and the semantic distance is the inverse of a sum of the inverted individual semantic distances, or is a positive function thereof;
      accepting, in the ontology, an alternative class as a match to a class in the query, if and only if, a corresponding semantic distance is no higher than the divergence value;
      defining, in the query, a non-zero divergence value for at least one of the classes; and
      identifying a patterns of instances and associated interrelationships by treating, for each class having a non-zero divergence value, one or more broader classes of the ontology is as a match; and
   outputting via a user interface, one or more of:
      a matching statement comprising an identified pattern defining a statement identifying the fact matching the user requirement; or
      a search result comprising a subset of the text documents, location within the text documents, or hyperlinks to the text documents, from which the instances and interrelationships of the identified pattern were obtained.

2. The computer implemented method of claim 1, wherein outputting the matching statement comprising the identified pattern further comprises presenting results to a user via a graphical interface, in an order defined by a total divergence value associated with each result, the total divergence value being a positive function of the semantic distances of the respective classes in the result from the respective classes or instances in the query.

3. The computer implemented method of claim 1, wherein the fact matching the user requirement comprises an identity or a nature of one or more of:
   a physical object or substance;
   an action of a physical object;
   a signal;
   a person;
   an action of a person;
   a clinical condition;
   a clinical treatment;
   a solution to a problem;
   a financially stressed customer of one or more finance products;
   a stress factor indicative of financially stressed customers of one or more finance products;
   a physical product;
   a financial product; and
   an investment or sales opportunity.

4. The computer implemented method of claim 3, wherein the fact matching the user requirement is the identity or nature of a physical object, physical signal or physical substance, or an action of a physical object.

5. The computer implemented method of claim 3, wherein the fact matching the user requirement is the identity or nature of a person, or a personal act.

6. The computer implemented method of claim 5, wherein the fact matching the user requirement is the identity or nature of a criminal, or a criminal act.

7. The computer implemented method of claim 3 wherein the fact matching the user requirement is the identity or nature of a clinical condition.

8. The computer implemented method of claim 3, wherein the fact matching the user requirement is the identity or nature of a clinical treatment.

9. The computer implemented method of claim 3, wherein the fact matching the user requirement is the identity or nature of a solution to a problem.

10. The computer implemented method of claim 3, wherein the fact matching the user requirement is the identity or nature of a financially stressed customer of one or more finance products.

11. The computer implemented method of claim 3, wherein the fact matching the user requirement is the identity or nature of a stress factor indicative of financially stressed customers of one or more finance products.

12. The computer implemented method of claim 3, wherein the fact matching the user requirement is the identity or nature of a physical product.

13. The computer implemented method of claim 3, wherein the fact matching the user requirement is the identity or nature of a financial product.

14. The computer implemented method of claim 3, wherein the fact matching the user requirement is the identity, or nature of an investment or sales opportunity.

15. The computer implemented method of claim 1, the method further comprising:
   converting one or more text documents to generate a semantic database comprising instances and interrelationships; and outputting the text documents or a location of the text documents, from which the instances and interrelationships of at least one statement identifying a fact matching the user requirement, were generated.

16. The computer implemented method of claim 15, wherein the location comprises at least one unique resource locator (URL).

17. A computer apparatus comprising:
a non-transitory computer readable data storage medium comprising computer instructions stored therein, and
a computer processor configured to perform the computer instructions, wherein the computer instructions are arranged to control the computer processor to perform the computer implemented method of claim 1.

18. A non-transitory computer readable medium storing computer-executable program instructions stored thereon, wherein when executed by a processor, cause the processor to perform the computer implemented method of claim 1.

* * * * *